United States Patent [19]

Radewagen

[11] Patent Number: 5,799,770
[45] Date of Patent: Sep. 1, 1998

[54] METHOD FOR THE TRANSFER OF SEPARATED GOODS AND TRANSFER DEVICE

[75] Inventor: Klaus Radewagen, Wendlingen, Germany

[73] Assignee: LTG Lufttechnische Gesellschaft mit beschränkter, Stuttgart, Germany

[21] Appl. No.: 695,392

[22] Filed: Aug. 12, 1996

[30] Foreign Application Priority Data

Jun. 14, 1996 [DE] Germany ............... 196 23 872.2

[51] Int. Cl.[6] ............................................ B65G 47/26
[52] U.S. Cl. .............................................. 198/432
[58] Field of Search ............... 198/432, 418.5, 198/433

[56] References Cited

U.S. PATENT DOCUMENTS

| | | | |
|---|---|---|---|
| 3,066,787 | 12/1962 | Allgeyer | 198/432 |
| 3,209,923 | 10/1965 | Bargel et al. | 198/432 |
| 4,718,535 | 1/1988 | Wolff | 198/432 |
| 5,329,668 | 7/1994 | Schlichter | 198/433 |
| 5,456,563 | 10/1995 | Halbo | 198/432 |

FOREIGN PATENT DOCUMENTS

563 461 A1  10/1993  European Pat. Off. .

*Primary Examiner*—Joseph E. Valenza
*Assistant Examiner*—Khoi H. Tran
*Attorney, Agent, or Firm*—Hardaway Law Firm P.A.

[57] ABSTRACT

A method and device for the transfer of goods, in particular aluminum cans, from a first conveyor to a second conveyor. The goods are cyclically transferred in groups. On the first conveyor, the groups are disposed along the conveying direction of the first conveyor. When placed on the second conveyor, the groups are disposed transverse to the conveying direction of the second conveyor. The groups of goods are preferably held by vacuum during the transfer from the first conveyor to the second conveyor. In order to preserve the row-wise separation of goods present on the first conveyor, the device transfers goods in such a manner that, when viewed transversely, in particular perpendicularly, to the conveying direction of the first conveyor, groups of goods being transferred do not overlap with the other groups of goods being transferred.

12 Claims, 2 Drawing Sheets

METHOD FOR THE TRANSFER OF SEPARATED GOODS AND TRANSFER DEVICE

BACKGROUND OF THE INVENTION

1. Field of the Invention

This invention relates to a method for the transfer of goods delivered by a first conveying means, in particular aluminum cans, which are cyclically transferred groupwise, as rows pointing in the conveying direction of the first conveying means, from the first conveying means to a second conveying means, wherein the goods are set down on the second conveying means in such fashion that rows transverse to its conveying direction are formed, each group of goods preferably being held by vacuum during the transfer movement.

2. Description of Related Art

The first conveying means can be, for example, a first strand on which the goods are arranged in a plurality of rows, at least in two rows. From the rows, a transfer device picks up a group of goods at a time and transfers them to the second conveying means, on which the goods are set down. Setting down occurs with an orientation of the rows such that the longitudinal direction of the rows runs transversely to the conveying direction of the second conveying means. If the second conveying means is, for example, also a strand, the rows of set-down goods run transversely, in particular perpendicularly, to the longitudinal extent of the strand. The goods can preferably be cans, in particular beverage cans, which are printed in a printing press arrangement located upstream of the first conveying means and are then conveyed with the first conveying means to the transfer device. The transfer device rearranges the cans picked up groupwise in such fashion that they are set down on the second conveying means in rows running parallel to one another, the longitudinal extent of these rows running transversely to the conveying direction of the second conveying means. In this way, the second conveying means becomes very compact and is populated with goods over an appropriately selected width, which goods—in the case of the cans mentioned—are delivered, for example, to a drying means (continuous-flow drying means). The transfer device is made such that, by means of its pickup means, it picks up goods from the first conveying means, the transfer device moving synchronously with the goods during the pickup operation so that there is no, or only slight, relative movement between the goods and the pickup means during the pickup operation. This guarantees a positionally accurate and thus safe transference even at high speeds. The same holds for the operation of setting down on the second conveying means. Here, too, the pickup means moves in a defined trajectory region, synchronously or almost synchronously with the conveying medium of the second conveying means, so that positionally accurate setting down is possible without the goods colliding with one another, toppling over, and so forth. Because the transfer operation must be performed very rapidly because of the large number of goods delivered, it is necessary to hold the goods very firmly to the pickup means on account of the acceleration forces arising during the transfer operation. A vacuum holding device is preferably used for this purpose, that is, vacuum is applied to the goods from above and the goods are then shifted. For this purpose it is not necessary that the pickup means change its vertical position, but it can instead move in a plane. If it is located a slight distance above the top edges of the cans for pickup, this is sufficient for vacuum application. A similar situation obtains for setting down, the setting-down operation being effected by cutting off the vacuum so that the goods are released and set down on the second conveying means. A transfer device of the type described at the outset is implied by European Patent Application 0,563,461. This known transfer device has the disadvantage that only goods of identical type can be transferred. It is not possible, for example, to deliver differently printed cans by means of the first conveying means and then transfer them in such fashion that the goods, sorted by type, stand on the second conveying means. This is necessary, for example, if aluminum cans for a beverage A are delivered in a first row and aluminum cans for a beverage B are delivered in a second row by the first conveying means. Accordingly, it is necessary to place the cans that are assigned to the beverage A on the second conveying means separately from the cans that are later to hold the beverage B and are correspondingly differently made, for example differently printed.

SUMMARY OF THE INVENTION

It is therefore an object of the invention to make possible the previously mentioned separation of the goods.

According to the invention, this object is achieved by virtue of the fact that, in order to preserve a row-wise separation of goods present on the first conveying means, the transfer is effected in such fashion that in each cycle the goods located on the first conveying means are removed in such fashion that an arrangement of goods prevails in which, as viewed transversely, in particular perpendicularly, to the conveying direction of the first conveying means, the currently removed group of a row does not overlap the simultaneously removed group of another row. Consequently, the procedure according to the invention is such that, for example, of two rows of goods delivered by means of the first conveying means, one group of goods is removed at a time, the rows of goods not overlapping as viewed transversely to the conveying direction of the first conveying means, that is, each of the two groups to be conveyed away exhibits a length that is smaller than the total working region of the pickup means used for the transfer, in particular in such fashion that half of the working width of the pickup means is accessible to each row of goods delivered by the first conveying means. By this means, the goods are set down on the second conveying means in such fashion that the one group of goods is set down on one half—as viewed in the conveying direction of the second conveying means—and the other group of goods is set down on the other half of the working width of the second conveying means, these two row-shaped groups not, however, forming a continuous total row lying in a plane but—because of the corresponding pickup position—being offset from one another by a distance that corresponds to one cycle.

According to a development of the invention, it is provided that, as viewed transversely, in particular perpendicularly, to the conveying direction of the first conveying means, the removed group of one row overlaps the group of another row not removed until the next cycle. In particular it is insured by this means that the goods are set down in grid fashion on the second conveying means.

It is advantageous if the group of a row located on the first conveying means lying farther away from the second conveying means is located in leading position—with respect to the conveying direction of the first conveying means—relative to a group of another row located on the first conveying means to be conveyed in the same cycle. In conjunction, this leads to the result that, upon the pickup of the cans, the pickup means executes a motion that is in the same direction as the conveying direction of the first conveying means; that the cans with vacuum applied to them have free room for transfer to the second conveying means, without collisions occurring with other goods located on the first conveying means.

The invention further relates to a transfer device for goods delivered by a first conveying means, in particular aluminum cans, which are cyclically transferred groupwise, as rows pointing in the conveying direction of the first conveying means, from the first conveying means to a second conveying means, wherein the goods are set down on the second conveying means in such fashion that rows transverse to its conveying direction are formed, said transfer device having a pickup means that holds the current group of goods during the transfer movement, which pickup means is guided along a closed motion path by means of at least one linkage, wherein said pickup means exhibits holding means for the goods, which holding means are arranged correspondingly to the row spacing of the arrangement of the goods on the first conveying means, and wherein, as viewed transversely, in particular perpendicularly, to the conveying direction of the first conveying means, the holding means provided for one row do not overlap the holding means provided for another row. As a result, groups of goods are picked up by means of the holding means, one group of goods—for example in the case of two rows of goods on the first conveying means—being held on the pickup means in a fashion not overlapping with the other group. Instead, the two groups lie offset to one another, the word "offset" referring to a viewing direction that runs transversely to the conveying direction of the first conveying means.

According to a development of the invention, it is provided that the holding means lying farther away from the second conveying means—as viewed in the conveying direction of the first conveying means—are arranged in leading position relative to the holding means lying closer to the second conveying means. In particular, the holding means are vacuum apertures, in particular vacuum slots, which are provided with vacuum by means of a suitable control means. In particular it is provided that the closed motion path of the pickup means is roughly pear-shaped, the tip of the "pear" pointing toward the second conveying means. The region of the base of the "pear" of the motion path lying opposite the tip is traversed in a direction that corresponds to the motion of the first conveying means.

The Drawing illustrates the invention on the basis of an exemplary embodiment.

DETAILED DESCRIPTION

Figure 1:
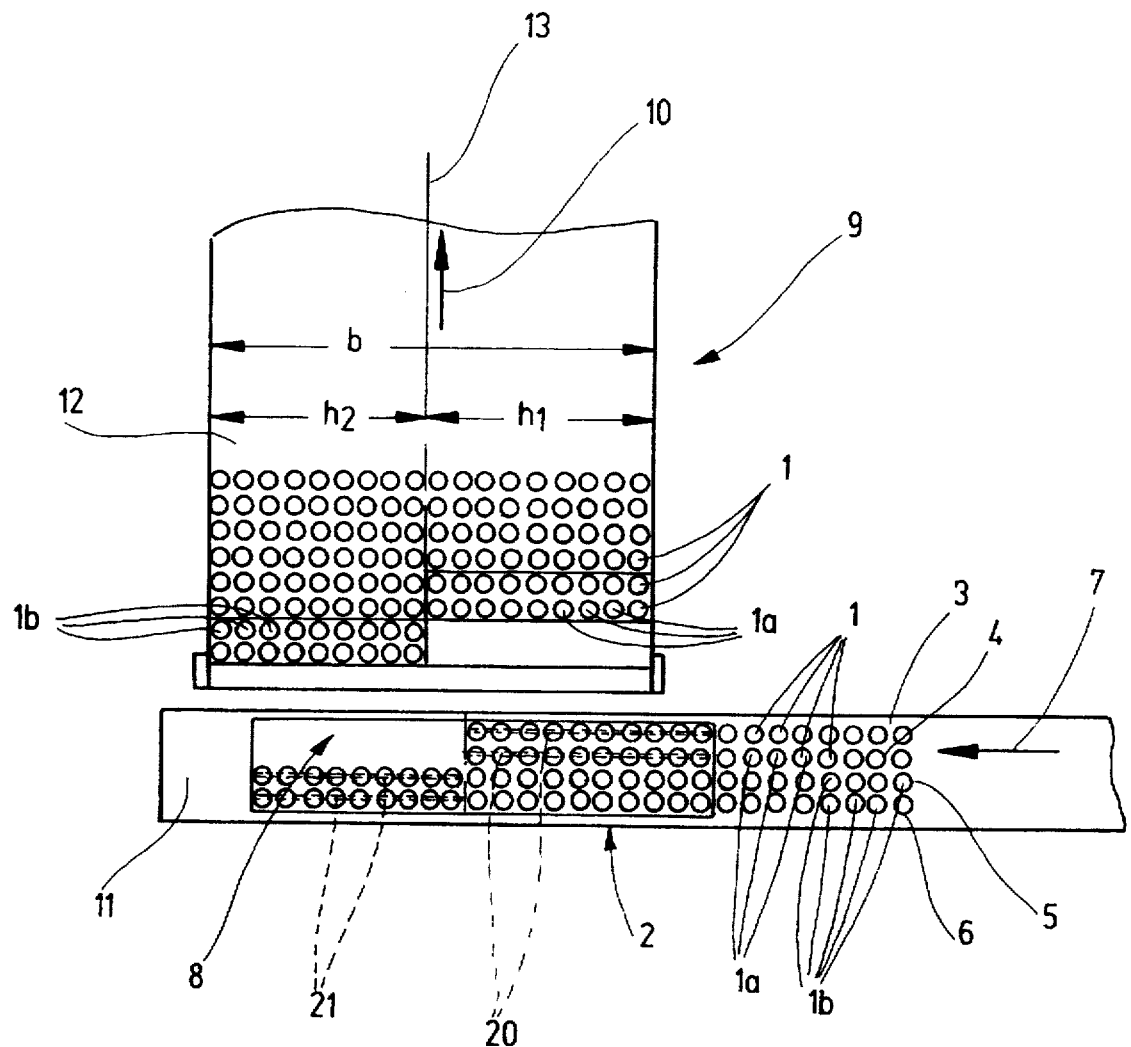
FIG. 1 shows a plan view, in schematic representation, of a first and a second conveying means on which goods are arranged, which goods are transferred by means of a transfer device not shown in more detail.

FIG. 1 shows a plan view of a transfer region of goods 1, wherein the goods 1 are freshly painted sheet-metal cans, as are known, for example, from the beverage industry. The goods 1 are delivered in row fashion by means of a first conveying means 2. In the example here, there are four rows 3, 4, 5 and 6 of goods 1, the row orientation being in the same direction as the conveying direction 7 of the first conveying means 2. It is assumed that rows 3 and 4 are formed by goods 1a and that rows 5 and 6 are made up of goods 1b. Goods 1a and 1b differ in that, for example, they are differently printed, for example goods 1a serving to hold a beverage A and goods 1b to hold a beverage B. It is thus possible that goods 1a are printed by a first printing press located upstream of the first conveying means 2 and goods 1b are printed by a second printing press located upstream of the first conveying means 2, and are set down in appropriate arrangement, as can be seen in FIG. 1, on the first conveying means 2, which conveys them to a transfer device 8, not further illustrated in FIG. 1, which transfers the goods 1a, 1b to a second conveying means 9, which exhibits a conveying direction 10 that, as viewed in the horizontal plane, is transverse, in particular perpendicular, to the conveying direction 7.

The first conveying means 2 and the second conveying means 9 are each a strand 11 and 12 respectively.

The transference of the goods 1a, 1b from the first conveying means 2 to the second conveying means 9 is now effected in such fashion that, as viewed in the conveying direction 10 of the second conveying means 9, the goods 1a are set down on one half $h_1$ as viewed across the width b of the second conveying means 9, and the goods 1b are set down on the other half $h_2$. In particular, it can be provided that the halves $h_1$ and $h_2$ are isolated from one another by means of a separating means 13, in order to prevent goods of one region reaching the other region if, for example, these goods are not firmly positioned because of malfunctions. The separating means 13 can be, for example, stretched guide wires or the like.

Figure 2:
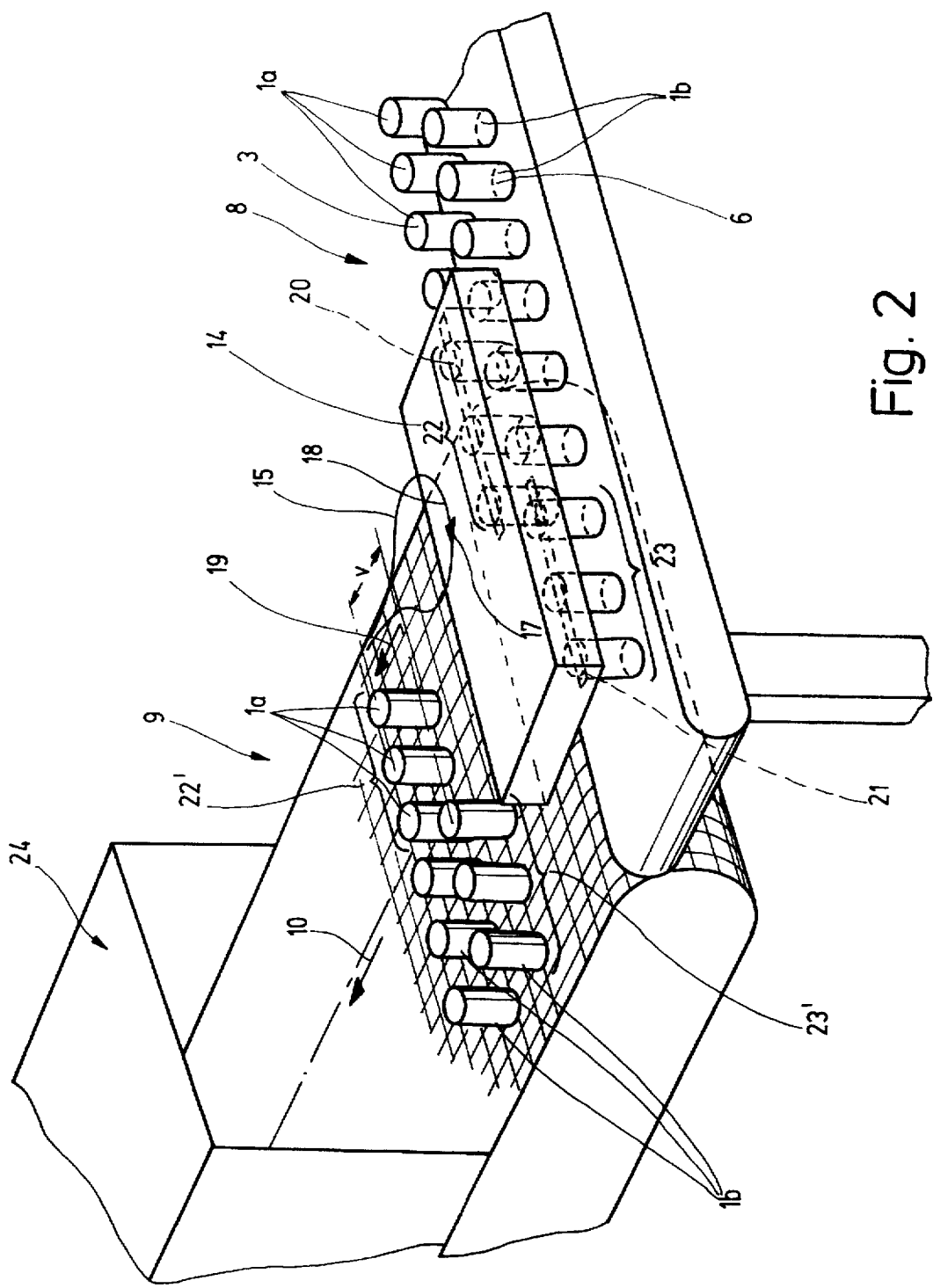
FIG. 2 shows a perspective view of the arrangement of FIG. 1.

According to FIG. 2, the transfer device 8, not shown in detail for the sake of simplicity, exhibits a pickup means 14, which is made as a vacuum bar that has its longitudinal direction extending in the direction of the conveying direction 7 of the first conveying means 2. The pickup means 14 moves along a closed motion path 15, which is made in pear shape with the tip 16 of the pear pointing in the direction to the second conveying means 9. The sense in which the motion path 15 is traversed is indicated by means of an arrow 17 in FIG. 2. It can be seen that the region of the base 18 of the "pear" formed by the motion path 15 has a direction of movement during the operation of picking up goods 1 that corresponds in direction and speed to the movement of these goods 1 on the first conveying means 2. By means of an arrow 19 in the region of the tip 16 of the pear-shaped motion path 15, it is indicated that the goods 1 taken over by the pickup means 14 are set down on the second conveying means 9 when the direction and the speed of the pickup means 14 roughly correspond to the motion characteristics of the second conveying means 9. In this fashion it is insured that the goods 1 are taken over in positionally accurate fashion and are again set down in positionally accurate fashion without the objects toppling over and so forth. The goods are held on the pickup means 14 by means of vacuum, which is activated in order to pick up the goods 1 and deactivated in order to set down the goods 1. To this end, a control means is provided. According to FIGS. 1 and 2, vacuum slots 20 and 21 are provided for this holding of the goods 1 to the pickup means 14, the vacuum slots 20 cooperating with the goods 1a and the vacuum slots 21 with the goods 1b. The illustrations of FIGS. 1 and 2 differ in that the development of FIG. 1 is suitable for the transfer of four parallel rows of goods 1 and the means of FIG. 2 is suitable for the transfer of two rows of goods delivered by means of the first conveying means 2.

For the sake of simplicity, the development of FIG. 2 will be discussed in what follows. The corresponding development is present in the exemplary embodiment of FIG. 1, wherein, however, two vacuum slots 20 running parallel to one another are provided instead of one vacuum slot 20, and two vacuum slots 21 running parallel to one another are provided instead of one vacuum slot 21.

According to FIG. 2, the vacuum slot 20 lies nearer to the second conveying means 9 than does the vacuum slot 21, as viewed perpendicularly to the conveying direction 7 of the first conveying means 2. This is the case especially when the pickup means 14 is located above the first conveying means 2, that is, for example, when it is taking over precisely goods 1. The vacuum slots 20 and 21 exhibit a longitudinal extent that corresponds to the conveying direction 7, the two slots 20 and 21 running parallel to one another some distance apart and their perpendicular spacing from one another being equal to the distance between the two rows of goods 1a and 1b on the first conveying means 2. Further, with regard to the longitudinal extent, the two vacuum slots 20 and 21 are offset relative to one another, as viewed perpendicularly to the conveying direction 7 of the first conveying means 2, in such fashion that they do not overlap, or that groups of picked-up goods 1a and 1b do not overlap. If one considers the goods 1a forming one row 3, then—as shown schematically here—three goods 1a are taken over by the vacuum slot 20 by the pickup means 14; that is, these three goods 1a form one group 22. With regard to the goods 1b, vacuum is applied to a group 23 there by the assigned vacuum slot 21. The two groups 22 and 23 lie offset relative to one another, as viewed in the conveying direction 7. Further, as viewed perpendicularly to the conveying direction 7, that is, in the conveying direction 10 of the second conveying means 9, the group 23 leads the group 22, and indeed the amount of lead corresponds to the length of the group 22 or 23.

Now if, in the course of the transfer operation, the pickup means 14 moves into a position above the second conveying means 9, doing so along the closed, pear-shaped motion path 15, then this leads to the group 22 being assigned to the first half $h_1$ and the group 23 to the second half $h_2$ of the second conveying means 9. This is indicated in FIG. 2 in such fashion that, in the previously executed movement cycle of the pickup means 14, goods 1a have been set down as group 22' and goods 1b as group 23' on the second conveying means 9. Because of the spacing of the two rows 3, 6 of goods 1 on the first conveying means 2, an offset of the respective groups 22' and 23' of goods 1a and 1b relative to one another is formed on the second conveying means 9. This offset is identified by the letter v. In this fashion it is insured that only goods of type 1a are set down on the one half, namely on the first half $h_1$, and only goods of type 1b are set down on the other half, namely the second half $h_2$, of the second conveying means 9. Thus the goods are separated in respect of their type, namely, for example, in respect of their printing, so that they can pass, for example, through a tunnel dryer 24 in this ordered condition, at the end of which tunnel dryer they can then be taken up from the conveying means 9 in separated form and subjected to downstream processing.

The Description has essentially discussed a delivery of the goods 1 by means of the first conveying means in the form of two rows. It is, naturally, also possible to provide further parallel rows, as follows, for example, from FIG. 1. The principle of the invention is there realized in the same fashion, a plurality of groups 22 and, respectively, a plurality of groups 23 always being transferred at one time by the transfer device 14.

That which is claimed:

1. A cyclical method for transferring goods; said goods comprising a plurality of categories; said categories aligned in a plurality of rows, which comprises:

conveying said rows of said goods in a first direction;

picking up a subset of said goods from a first location; said subset comprising a group of said goods from each of said categories; each of said groups having no overlap between the other of said groups when viewed transversely to said first direction;

moving said subset of said goods to a second location along a closed motion path;

conveying said subset of said goods from said second location in a second direction;

whereby row-wise separation of said categories of said goods is preserved.

2. The method of claim 1, wherein at least one of said groups overlap with a remainder of said goods not in said subset of at least one of the other of said categories when viewed transversely to said first direction.

3. The method of claim 1, wherein each of said groups have lateral and longitudinal positions in said first position different than said lateral and longitudinal positions of the other of said groups, wherein said group having said lateral position that is furthest away from said second location has said longitudinal position that is furthest forward, with respect to said first direction.

4. The method of claim 1, wherein each of said categories of said goods comprise a plurality of rows.

5. A device for cyclically transferring goods; said goods comprising a plurality of categories; said categories aligned in a plurality of rows, which comprises:

a first means for conveying said rows of said goods in a first direction;

means for picking up a subset of said goods from said first conveying means; said subset comprising a group of said goods from each of said categories; each of said groups having no overlap between the other of said groups when viewed transversely to said first direction;

means for moving said pickup means along a closed motion path;

a second means for conveying said subset of said goods in a second direction; said second conveying means located along said closed motion path;

whereby row-wise separation of said categories of said goods is preserved.

6. The apparatus of claim 5, wherein said closed motion path is approximately a pear shape;

said pear shape having a base end and a tip end;

said tip end of said pear shaped motion path points toward said second conveying means.

7. The apparatus of claim 6, wherein said base end of said pear shaped motion path points toward said first conveying means.

8. The apparatus of claim 5, wherein said pickup means further comprises:

a plurality of means for holding said subset of said goods;

wherein each of said holding means has a lateral and longitudinal position that is different than said lateral and longitudinal positions of the other of said holding means;

wherein said holding means having said lateral position that is furthest away from said second conveying means has said longitudinal position that is furthest forward, with respect to said first direction.

9. The apparatus of claim 8, wherein said holding means comprises vacuum apertures.

10. The method of claim 3, wherein said group having said lateral position that is closest to said second location has said longitudinal position that is most rearward, with respect to said first direction.

11. The apparatus of claim 8, wherein said group having said lateral position that is closest to said second location has said longitudinal position that is most rearward, with respect to said first direction.

12. The apparatus of claim 5, wherein each of said categories of said goods comprise a plurality of rows.

* * * * *